No. 65,981.
A. B. WOOD.
MECHANICAL POWER.
PATENTED JUNE 18, 1867.
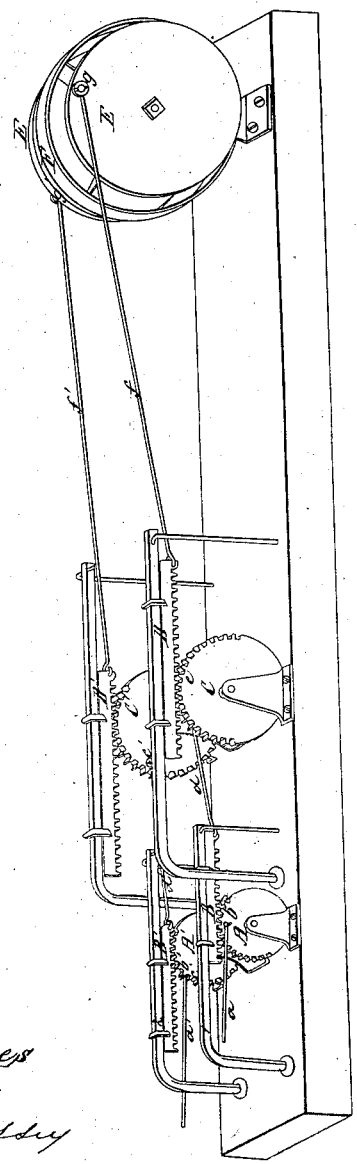

AUGUSTUS B. WOOD, OF HAMBURG, ARKANSAS, ASSIGNOR TO HIMSELF, W. W. WOOD, AND W. H. WOOD, OF THE SAME PLACE.

*Letters Patent No. 65,981, dated June 18, 1867.*

IMPROVEMENT IN MECHANICAL POWERS.

*The Schedule referred to in these Letters Patent and making part of the same.*

TO ALL WHOM IT MAY CONCERN:

Be it known that I, AUGUSTUS B. WOOD, of Hamburg, Ashley county, and State of Arkansas, have invented a certain new, useful, and improved Machine for Increasing Mechanical Power without loss or diminution of speed; and I do hereby declare the following to be a full, clear, and exact description of the same, reference being had to the annexed drawing, making a part of this specification, which exhibits a perspective view of my invention in its simplest form.

The object of my invention is to increase the power of any given motor engine or machine, without making any inherent positive addition thereto, by the use of mechanical agencies that are entirely extraneous and distinct from said motor, excepting so far as they are connected therewith in the operation of the same; and to do this I interpose between the point at which the power of said machine is directly applied, as, for example, its crank and the point at which the increase of power is to be attained and applied, an intermediate system of gearing consisting of certain cogged or ratchet-bars, and cogged or ratchet oscillating segments, operating cranks progressively increasing in length at the same rate of motion as the first or driving-crank, and with the same proportionate power. But my invention will be better understood by reference to the drawings.

A A' are the driving-wheels through which power and motion are communicated from the engine operating them, (the engine is not shown on the drawings,) by means of the pitmen $a\ a'$ connected to crank-pins or wrists $b\ b'$. Extending just half way around the circumference or perimeters of these driving-wheels A A' are cogged segments $c\ c'$, which fit into ratchet or cog-bars B B' that are sustained by and slide upon suitable slide-bars 1 and 2. The driving-wheels A A', not revolving the segments $c\ c'$, have a vibrating or oscillating motion of not quite but very nearly ninety degrees sweep; that is to say, the stroke of the cylinders which operate the segments $c\ c'$ is just short of what would be required to revolve the driving-wheels, and hence the crank-pins $b\ b'$ vibrate backwards and forwards in the arc of a circle above the axes of the said driving-wheels, and of course carry the segments with them. The wrist or crank-pins $b\ b'$ are so placed with reference to their axes, that the length of the cogged bars B B' will be one-third greater than the diameter of the driving-wheels A A', in order that the former may correspond in length with the length of the segments $c\ c'$. Intermediate wheels C C', having a diameter exactly equal to the length of the bars B B', are connected to the latter by means of links or arms $d\ d'$ and wrist or crank-pins $e\ e'$. These intermediate wheels C C' are also provided, like the driving-wheels A A', with cog segments extending half way around their perimeter, which work in and are operated by ratchet sliding-bars D D', the length of which is one-third greater than the diameter of the said intermediate wheels C C'. To the sliding-bars D D' are connected the crank-wheels E E' by means of links $f\ f'$ and crank-pins $g\ g'$. The crank-pins $g\ g'$ are twice as far from the axes of wheels E E' as the crank-pins $b\ b'$ are from the axes of wheels A A', or, in other words, the cranks upon the former are twice as large as the cranks upon the latter, and hence it follows that the power gained is equal to rather more, in practice, than two for one, less of course the loss or diminution from friction. When the parts are nicely adjusted and work smoothly this loss is comparatively insignificant, so that one may assume the actual gain of power is about as above stated, two for one. In placing the crank-pins $g\ g'$ in the wheels E E', care must be taken so to fix them that their respective dead-points are forty-five degrees apart. This secures a corresponding relative adjustment of all the cranks, and hence a regular and constant application of power. Between the crank-wheels E E' is a belt-pulley or drum, F, through the medium of which the increased power that has been gained is applied to use. I prefer a belt-pulley; but obviously a cog-wheel may be substituted in lieu thereof, for the purpose of applying the increased power if deemed desirable.

I have not considered it requisite to describe herein, nor to exhibit upon the drawings, more than one intermediate system of gearing; but any number may be used. The greater the number that are interposed between the point of direct application and the desired point of application, the greater the increase of power.

Having thus described my invention, what I claim, and desire to secure by Letters Patent, is—

The interposition of intermediate mechanical parts or gearing between the point of direct application of power, and the point at which an increase of power is attained and applied for the purpose of increasing the capacity or power of any given motor engine or machine, when the same is effected substantially in the manner and by the means herein described.

A. B. WOOD.

Witnesses:
   A. A. HULL,
   J. F. BUSSEY.